United States Patent

Stenson et al.

[11] 4,038,489
[45] July 26, 1977

[54] CABLES

[75] Inventors: Derek William Stenson, St. Albans; Dennis Ray Bissel, Chesham, both of England

[73] Assignee: The Post Office, London, England

[21] Appl. No.: 582,415

[22] Filed: May 29, 1975

[30] Foreign Application Priority Data

May 31, 1974    United Kingdom ............... 24321/74

[51] Int. Cl.² .............................................. H01B 7/00
[52] U.S. Cl. ................................... 174/70 R; 174/10; 174/115; 350/96 B
[58] Field of Search ................ 174/70 R, 47, 115, 10, 174/108; 350/96 B

[56] References Cited

U.S. PATENT DOCUMENTS

| 1,969,764 | 8/1934 | Soutter, Jr. | 174/10 |
| 2,776,385 | 1/1957 | Modrey | 174/47 |
| 3,305,689 | 2/1967 | Leavy, Jr. et al. | 174/70 R |
| 3,434,775 | 3/1969 | Gosselin | 174/70 R |
| 3,498,286 | 3/1970 | Polanyi et al. | 350/96 B |
| 3,586,751 | 6/1971 | Schoerner | 174/115 |
| 3,660,590 | 5/1972 | Conant | 174/70 R |
| 3,766,307 | 10/1973 | Andrews, Jr. | 174/70 R |
| 3,865,466 | 2/1975 | Slaughter | 350/96 B |
| 3,883,218 | 5/1975 | Slaughter | 350/96 B |

FOREIGN PATENT DOCUMENTS

| 2,012,293 | 9/1971 | Germany | 350/96 B |
| 1,250,823 | 10/1971 | United Kingdom | 350/96 B |
| 1,260,339 | 1/1972 | United Kingdom | 174/47 |
| 447,816 | 5/1936 | United Kingdom | 174/47 |
| 676,224 | 7/1952 | United Kingdom | 174/47 |

Primary Examiner—Arthur T. Grimley
Attorney, Agent, or Firm—Kemon & Estabrook

[57] ABSTRACT

A cable for dielectric optical waveguides has the dielectric optical waveguides arranged in segmented compartments. Tensile members are provided in the core of the cable and/or externally of the segmented compartments. This particular cable construction prevents the dielectric optical waveguides being subjected to excessive tensile stress.

6 Claims, 3 Drawing Figures

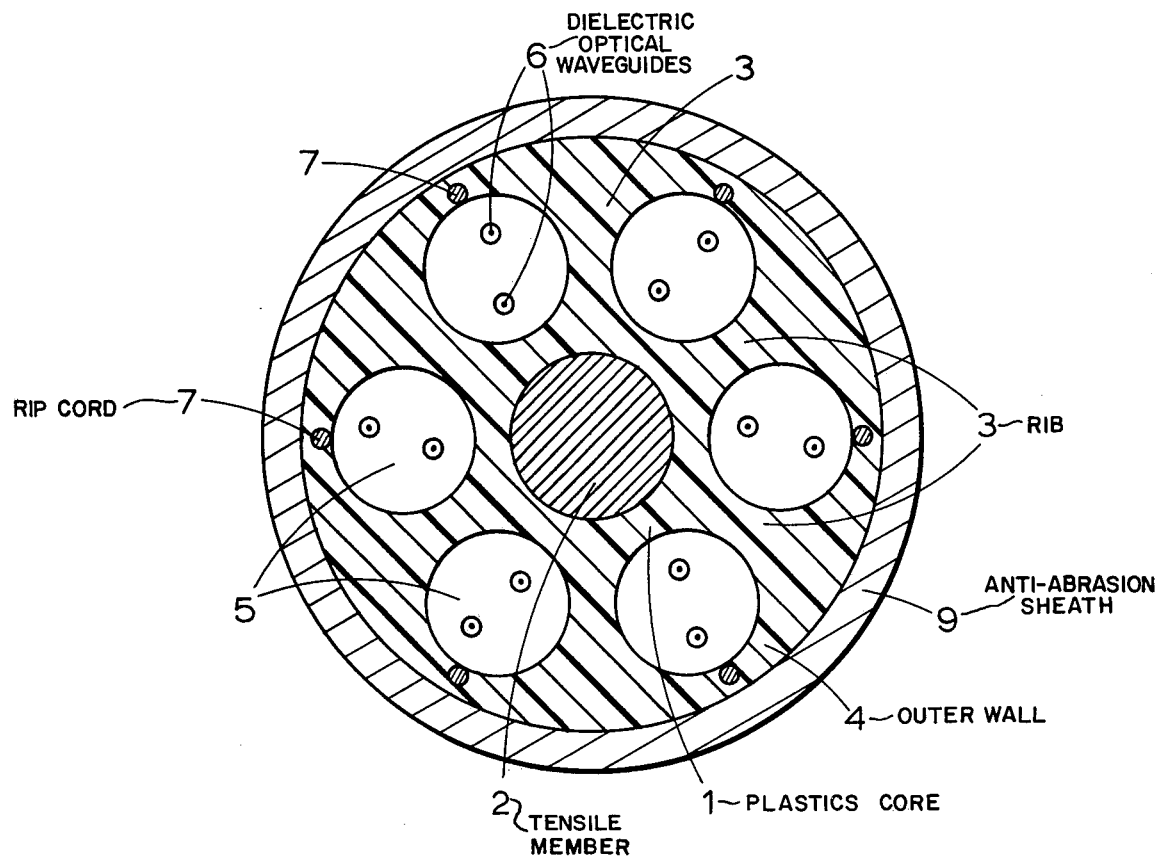

CABLES

The present invention relates to telecommunications cables for carrying dielectric optical waveguides.

The term optical as used herein is to be interpreted as referring to those regions of the electro magnetic spectrum more usually designated as the infra-red, visible, and ultra-violet.

If dielectric optical waveguides are to be used in optical communications systems, cables for carrying large numbers of dielectric optical waveguides must be used. The chief problem in designing a cable for dielectric optical waveguides, is to ensure that the dielectric optical waveguides which are fragile, are adequately protected against damage during the laying of the cable.

Typical dielectric optical waveguides used for telecommunication purposes, consist of glass fibres having a core and a cladding, with an overall diameter of 150 microns or less. In contrast to the copper conductors heretofor employed in telecommunications cables, dielectric optical waveguides are extremely fragile and brittle as opposed to ductile. This imposes entirely new constraints on cable design, and it is therefore apparent that previous designs of cables suitable for use with copper conductors are not suitable for use with dielectric optical waveguides.

Cables will almost certainly have to be pulled through lengths of cable ducting during laying. This operation can put the cable under considerable tensile stress. It is thus necessary to ensure that the cable has adequate tensile strength to withstand pulling tensions produced during laying. Furthermore, since the dielectric optical waveguides can only suffer an elongation of the order of 1% before failure it is necessary that the pulling tension should not be transmitted to the optical fibres. Again the cable must have sufficient compression strength to prevent damage to the fibres by lateral compression. Finally the cable must be so arranged that bending loads will not cause excessive elongation of the fibres and therefore failure of the fibres under tensile strain in excess of 1%.

According to the present invention there is provided a telecommunications cable comprising an outer wall separated from a central core by a plurality of rib elements; said outer wall, plurality of rib elements, and central core defining a plurality of compartments, each of said compartment partially filled with one or more coated dielectric optical waveguides.

Embodiments of the invention will now be described by way of example with reference to the accompanying drawings in which:

FIG. 3 shows a cross-section of a cable according to a third embodiment of the invention.

Figure 1:
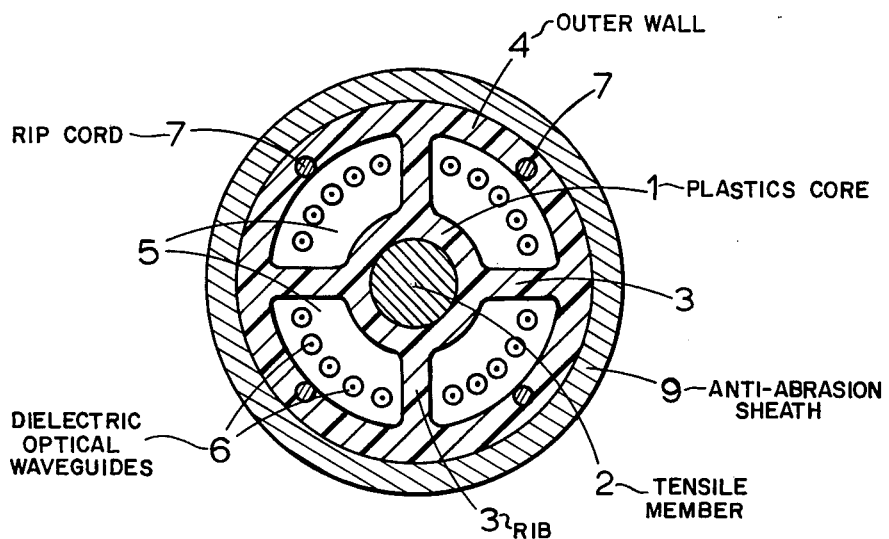
FIG. 1 shows a cross-section of a cable according to a first embodiment of the invention.

Referring now to the drawings, and FIG. 1 in particular, the cable consists of a plastics core 1 containing a tensile member 2 designed to limit elongation and bending at the stresses experienced by the cable during handling and installation, i.e. the tensile member limits the stress to which the dielectric optical waveguides 6 are subjected during handling of the cable. The tensile member may consist of steel or other metallic wires or fibres, e.g. glass, carbon, or other suitable fibres. The plastics core 1 is connected to an outer wall 4 by rib members 3. The core, rib members and outer wall may be formed as a single unitary structure. The outer wall 4, core 1 and rib members 3 form a number of compartments 5. Each of these compartments 5 is partially filled with dielectric optical waveguides 6. The dielectric optical waveguides which typically have an external diameter of 70 to 100 microns are coated with a suitable material, e.g. plastics, so that the effective outside diameter of the coating and fibre is 500 microns to 1000 microns. The dielectric optical waveguides are very loosely packed inside the compartment 5 so that they are free to move. This prevents the transfer of tensile stresses to the fibres during the pulling of the cable through ducts. The tensile member and the plastics sheath, i.e. plastics core, rib members and outer wall, interact as that friction forces set up when the cable is dragged through a duct, or otherwise handled, are transmitted to the tensile core member.

Rip cords 7 may be provided in the outer wall of the cable to permit easy stripping of the outer wall to provide access to the dielectric optical waveguides. The use of a rip cord reduces the risk of damage to the dielectric optical waveguides during the stripping operation. The rip cords can be positioned at any point along the periphery of a compartment.

The compartments 5 may be formed with a twist so that the dielectric optical waveguides are arranged in a helix about the central core 1.

The central core 1, ribs 3, and outer wall 4 may be formed as a unitary whole by extrusion.

An additional outer sheath 9 may be provided to give protection against abrasion etc., when the cable is drawn through ducting.

Figure 2:
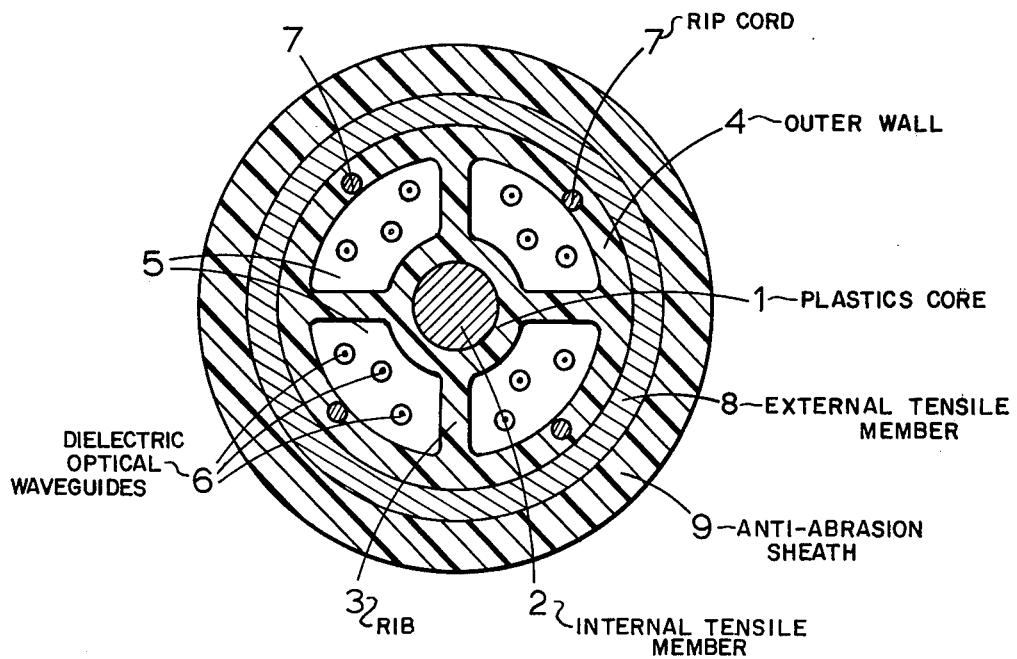
FIG. 2 shows a cross-section of a cable according to a second embodiment of the invention.

A tensile sheath, 8, see FIG. 2, may be provided externally of the segmented compartments. This may take the form of axially arranged wires, a steel sheath, or fibres. When a tensile sheath 8 is used the outer sheath 9 also serves to protect sheath 8 against corrosion.

If wires or fibres are used to form the external tensile member these may be braided.

When both central and external tensile members are used, the tensile load on the cable during laying is shared by both tensile members. Tensile loading of the external tensile member assists the ability of this member to withstand crushing loads which might otherwise cause compartments 5 to collapse.

A third embodiment of the invention is shown in FIG. 3. The form is broadly similar to the embodiment of FIG. 1 and like integers have the same reference numerals. The nature of this embodiment is self-evident from the drawing.

When the internal and external tensile members are made of an electrically conducting material, either or both may be used as power feeds for repeaters etc., arranged along the cable.

What we claim is:

1. A telecommunications cable comprising an outer wall separated from a central core by a plurality of rib elements; said outer wall, plurality of rib elements, and central core defining a plurality of compartments, each of said compartments partially filled with two or more coated dielectrical optical waveguides, said central core including a tensile member.

2. A telecommunications cable as claimed in claim 1, wherein said tensile member comprises a plurality of steel wires.

3. A telecommunications cable as claimed in claim 2, wherein said outer wall contains a ripcord.

4. A telecommunications cable as claimed in claim 3, wherein there is provided a tensile sheath externally of, and circumjacent to, said outer wall.

5. A telecommunications cable as claimed in claim 4, wherein said tensile sheath comprises a plurality of steel wires.

6. A telecommunications cable as claimed in claim 4, wherein said tensile member and said tensile sheath are made of electrically conducting material.

* * * * *